(12) United States Patent
Lamoureux

(10) Patent No.: US 6,197,188 B1
(45) Date of Patent: Mar. 6, 2001

(54) FILTRATION SYSTEM FOR CONCENTRATING RADIOACTIVE DEBRIS

(75) Inventor: Edward F. Lamoureux, Hampden, MA (US)

(73) Assignee: GE Nuclear Power LLC, Windsor, CT (US)

( * ) Notice: Subject to any disclaimer, the term of this patent is extended or adjusted under 35 U.S.C. 154(b) by 0 days.

(21) Appl. No.: 09/265,823

(22) Filed: Mar. 10, 1999

Related U.S. Application Data
(60) Provisional application No. 60/093,774, filed on Jul. 23, 1998.

(51) Int. Cl.[7] ............................. B01D 27/00; G21F 9/04; G21F 9/22
(52) U.S. Cl. ..................... 210/138; 210/188; 210/195.1; 210/196; 210/253; 210/258; 210/259; 210/413; 210/539; 210/167; 588/20; 588/900
(58) Field of Search .......................... 588/16, 900, 20; 210/416.1, 512.1, 499, DIG. 9, 138, 188, 195.1, 196, 253, 258, 259, 323.2, 407, 413, 513, 538, 539, 167

(56) References Cited

U.S. PATENT DOCUMENTS 4,828,691 * 5/1989 Abbott et al. ........................ 210/87
5,001,870 * 3/1991 Yokota et al. ........................ 51/410

* cited by examiner

Primary Examiner—Robert Popovics
(74) Attorney, Agent, or Firm—Henry T. Crenshaw, Jr. Esq; Ronald P. Kananen; Rader, Fishman & Grauer

(57) ABSTRACT

A filtration system for concentrating radioactive debris particulate provides efficient filtration, concentration and transport to collection canisters of radioactive particles from a refueling cavity, spent fuel pool, or other water volume where small particles must be removed from the water. The system includes a flushing pump module that draws contaminated water from a cut zone enclosure. The flushing pump module has a separator that removes large size particulate from the contaminated water. A solid media filter module receives the contaminated water from the flushing pump module and removes medium size particulate from the contaminated water. The solid media filter module has a structure for ejecting the medium size particulate and passing the ejected particulate to a concentrate handling module having a purge tank and a slurry transfer pump. A disposal canister station receives the medium size particulate from the slurry transfer pump and fills disposal canisters for transport and storage. A cartridge filter module having multiple stages of cartridge filters for removing small size particulate receives a flushing flow of water from the solid media filter module. The filtered water is returned from the disposal canister station and from the cartridge filter module back into the cut zone enclosure to provide a closed-loop filtration system.

18 Claims, 2 Drawing Sheets

FILTRATION SYSTEM FOR CONCENTRATING RADIOACTIVE DEBRIS

RELATED APPLICATIONS

This application claims the benefit of U.S. Provisional Application Serial No. 60/093,774 filed on Jul. 23, 1998. The subject matter of this application is related to the subject matter of the Applicant's copending applications titled "Container for Handling and Storing Radioactive Debris," "System and Method of Sealing Container for Handling Radioactive Debris," and "Magnetic Filtration System for Minimizing Radioactive Waste During Abrasive Waterjet Cutting,", Application Ser. Nos. 09/265,826, 09/265,825 and 09/265,824, respectively, all of which were filed on Mar. 10, 1999, and are incorporated herein by reference.

BACKGROUND OF THE INVENTION

1. Field of the Invention

The present invention relates generally to filtration systems and the disposal of radioactive waste. In particular, the present invention relates to a filtration system for concentrating radioactive particles from a refueling cavity, spent fuel pool or other water volume where small particles must be removed from the water for disposal, improving water clarity, reducing radiation level, or other reasons.

2. Description of the Related Art

Commercial nuclear reactor power plants have various water volumes that are subject to contamination with radioactive debris particulate. These water volumes include, for example, the refueling cavity and the spent fuel pool. The particulate contained in these water volumes typically includes "crud" (corrosion products) and "cutting fines" that may range in size from sub-micron to several millimeters in cross-section. The cutting fines are often mixed with other non-radioactive particles that are byproducts of a cutting operation, such as abrasive or electrode materials.

There are several reasons that the radioactive debris particulate needs to be removed from the various water volumes in the nuclear reactor power plants from time-to-time. For example, the small particles often must be removed from the water for disposal, to improve water clarity, and/or to reduce the radiation level of the water volume. Therefore, there is a need for a system that provides efficient filtration, concentration, and transport to collection canisters of the radioactive particles from the various water volumes.

Vendors performing dismantling operations in the commercial nudear power decommissioning business have experienced significant problems with refueling cavity contamination, increased costs for disposal of waste, and dose rates to personnel that are not As Low As is Reasonably Achievable ("ALARA"). Contamination issues have been partly due to the lack of a control volume and closed-loop filtration system. High waste disposal costs have resulted from a failure to segregate and concentrate the particles by a separate means, rather than relying on the use of conventional cartridge-type filters alone. Minimizing the quantity of cartridge filters, which represent an increased volume of secondary waste, will reduce disposal costs. Dose rates to personnel can be reduced by controlling contamination through a closed loop system.

SUMMARY OF THE INVENTION

It is an object of the present invention to provide an improved filtration system for concentrating radioactive debris particulate that solves the problems associated with conventional systems for removing small radioactive particles from volumes of water.

It is a further object of the present invention to provide an improved filtration system that can be used to provide efficient filtration, concentration and transport to collection canisters of radioactive particles from a refueling cavity, spent fuel pool or other water volume where small radioactive particles must be removed from the water.

According to a broad aspect of the present invention, a filtration system is provided for concentrating radioactive debris particulate. The filtration system comprises: a flushing pump module that draws contaminated water from a water volume, the flushing pump module having a separator that removes large size particulate from the contaminated water; a solid media filter module in fluid communication with the flushing pump module, the solid media filter module having at least one solid media filter for removing medium size particulate from the contaminated water, and a structure for ejecting the medium size particulate from the solid media filter, a concentrate handling module in fluid communication with the solid media filter module to receive medium size particulate ejected from the solid media filter, the concentrate handling module comprising a tank and a transfer pump; and a disposal canister station in fluid communication with the transfer pump of the concentrate handling module, the disposal canister station having a structure that fills disposal canisters with the medium size particulate for disposal.

The filtration system also includes a cartridge filter module in fluid communication with the solid media filter module to receive a flushing flow of water from the solid media filter module. The cartridge filter module has at least one cartridge filter for removing small size particulate from the flushing flow of water passing from the solid media filter module. The cartridge filter module preferably has at least one coarse cartridge filter and one fine cartridge filter, whereby the small size particulate is removed in multiple stages.

The filtration system further includes a cut zone enclosure submerged in the water volume for separating and containing a portion of the water volume from a remainder of the water volume. The cut zone enclosure has a suction inlet through which the flushing pump module draws contaminated water from the cut zone enclosure. A floating hood is placed over the cut zone enclosure and has an outlet with a gas filtration system for purging gas from an area above the cut zone enclosure. The cartridge filter module and the disposal canister station are each connected to the cut zone enclosure for returning the filtered water back into the cut zone enclosure, thereby forming a closed-loop. filtration system.

The flushing pump module, the solid media filter module, the concentrate handling module, the cartridge filter module, and the disposal canister station are each provided with remotely operable disconnects and isolation valves that allow separate removal and replacement thereof.

According to another broad aspect of the present invention, a closed-loop filtration system is provided for removing radioactive particulate from a volume of fluid. The closed-loop filtration system comprises: an enclosure submerged in a fluid volume for separating and containing a portion of the fluid volume from a remainder of the fluid volume; and a filtering arrangement having an inlet that receives contaminated fluid from the enclosure, a structure that removes radioactive particulate from the contaminated fluid in multiple stages according to a size of the particulate, and an outlet that returns the fluid back into the enclosure. The filtering arrangement comprises a first means for removing large size particulate from the contaminated fluid, a second means for removing medium size particulate from the contaminated fluid, and a third means for removing small size particulate from the contaminated fluid.

Numerous other objects of the present invention will be apparent to those skilled in this art from the following description wherein there is shown and described a preferred embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE PREFERRED EMBODIMENT

Figure 1:
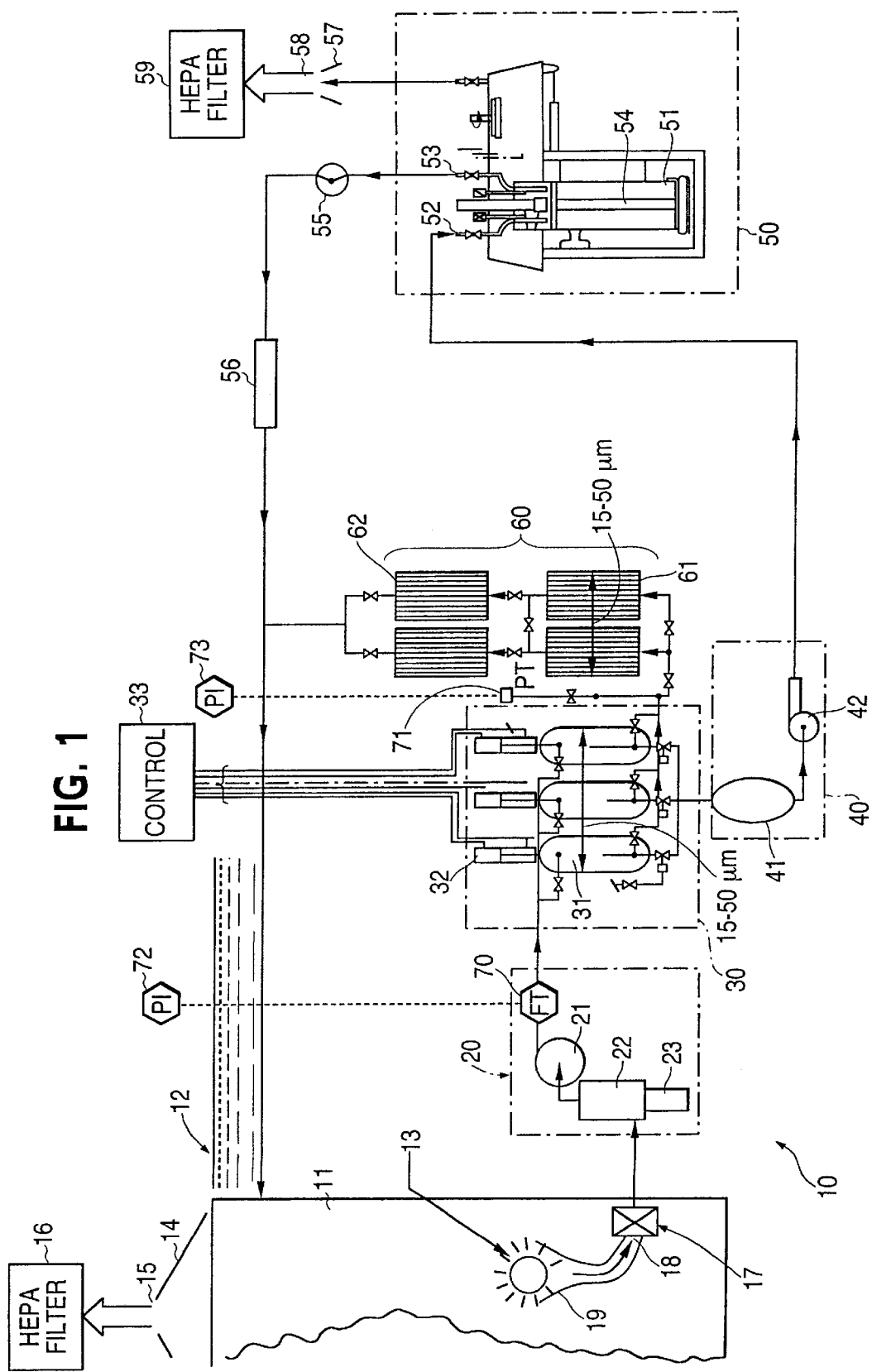
FIG. 1 is a schematic of a filtration system for filtering, concentrating and transporting radioactive debris according to the present invention.
Figure 2:
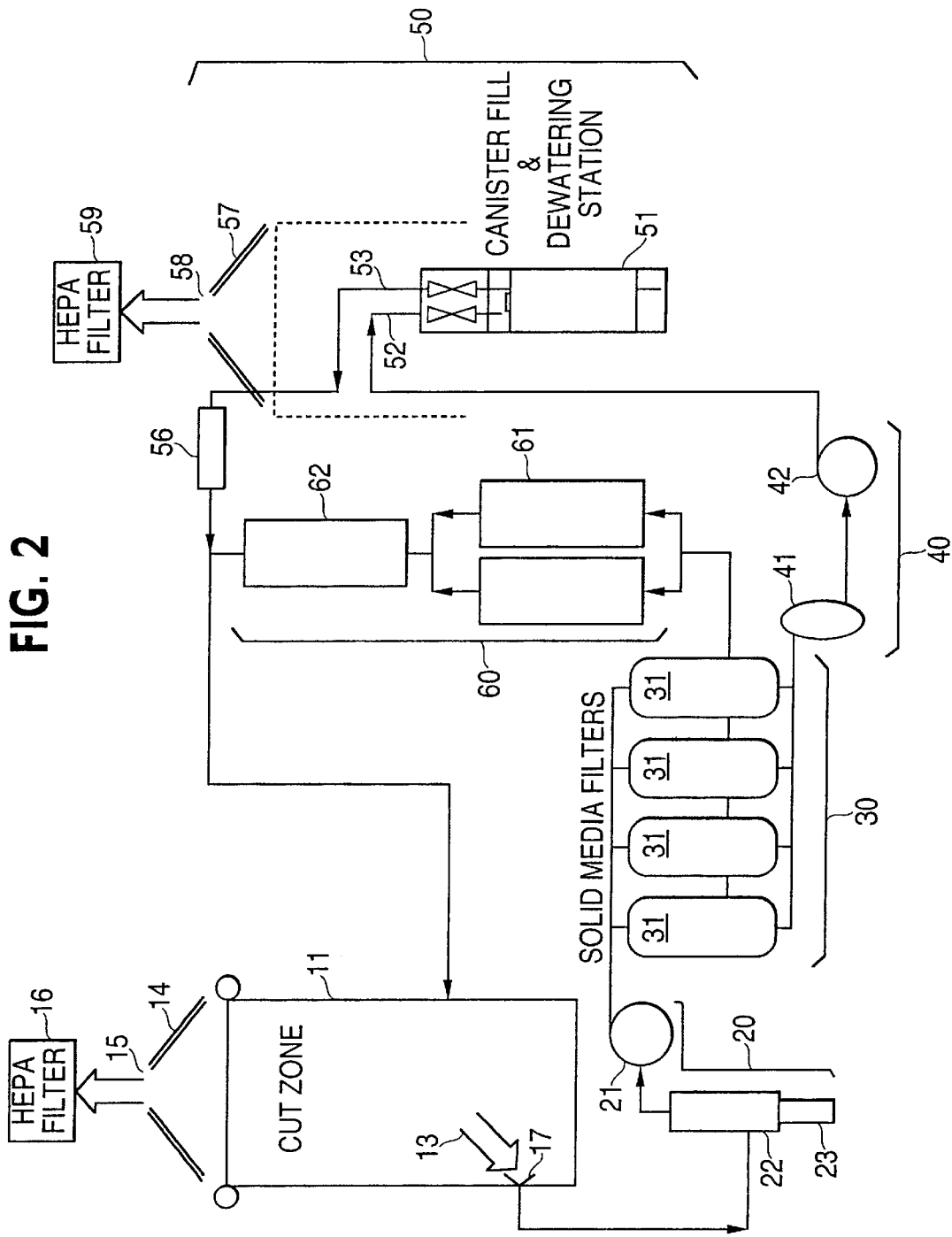
FIG. 2 is a simplified diagram of the filtration system shown in FIG. 1.

A filtration system 10 for filtering, concentrating, and transporting radioactive debris particulate according to a preferred embodiment of the present invention will now be described with reference to FIGS. 1 and 2 of the accompanying drawings.

The filtration system 10 according to the present invention uses a cut zone enclosure 11 submerged in a water volume 12 for isolating a portion of the water volume from a remainder of the water volume. The cut zone enclosure 11 provides an area in which a cutting tool 13 or other source of particulate can be operated, for example, during the dismantling of nuclear reactor internals. The cut zone enclosure 11 keeps the radioactive particulate generated during the cutting process separate from the remainder of the water volume 12 to prevent or minimize contamination of the general pool area water. A floating hood 14 is placed over the cut zone enclosure 11 and has an outlet 15 in communication with a HEPA gas filtration system 16 for purging gas from an area above the cut zone enclosure 11.

A header 17 having a suction opening 18 is provided in the cut zone enclosure 11 to draw contaminated water from the cut zone enclosure 11. A capture shroud 19 surrounds the suction opening 18 to facilitate the capture of radioactive debris particulate from a desired area within the cut zone enclosure 11. Other attachments, such as a surface skimmer or vacuum attachments (not shown), can be attached to the header 17 to suit a particular application.

A flushing pump module 20 has a flushing pump 21 that creates a suction for drawing contaminated water from the suction opening 18 within the cut zone enclosure 11. The flushing pump module 20 also contains a separator 22 that removes large size particulate, such as chips or slag from thermal processes, from the contaminated water. The separator 22 includes a settling tank, a cyclone and/or a screen on the inlet to separate out the large size particulate. The separated large size particulate is moved from the separator 22 into a transfer canister 23. The transfer canister 23 provides a means to remotely move the large size particles into disposal containers/casks used to remove the waste for burial or storage elsewhere. The settling tank, cyclone, and/or screen of the separator 22 are sized such that the large size particles removed by the separator 22 are of a size that can be mixed and disposed with solid waste, such as larger segmented parts of the reactor vessel or internals or other components, without the need for added stabilization. Thus, the large size particles removed by the separator 22 of the flushing pump module 20 need not be encapsulated by binding in a solid matrix or sealing in separate high integrity containers, as required by either the Code of Federal Regulations, local or state regulatory requirements for certain smaller size radioactive particles.

A water flow out of the flushing pump 21 of the flushing pump module 20 (now absent the larger size particles) is directed into a solid media filter module 30. The solid media filter module 30 contains a plurality of solid media filters 31 (a commercially available product) that concentrate medium size particles, i.e., typically in the size range of 15 to 50 microns. Within the solid media filters 31, the water flow travels from the inside to the outside of a fine metal mesh matrix (i.e., strainer). Particles that will not pass through the mesh are concentrated in the bottom of a vessel within the solid media filters 31 by a slowly reciprocating wiper piston 32. On either a preset pressure drop or timing cycle, a controller 33 momentarily opens a dump valve and ejects the concentrated particles from the solid media filters 31.

A concentrate handling module 40 receives the concentrated particulate ejected from the solid media filters 31. The concentrate handling module 40 has a purge tank 41 maintained at a pressure sufficiently below an internal pressure of the solid media filters 31 to provide the pressure differential necessary for ejecting the concentrate from the solid media filters 31. A transfer pump 42 intermittently moves the concentrated slurry from the purge tank 41 to a disposal canister fill and dewatering station 50 ("disposal canister station").

The disposal canister station 50 is located beneath the surface of the water volume 12 to provide radiological shielding to personnel. Canisters 51 suitable for confining the concentrated particulate are remotely filled through a fill line 52 and dewatered through a dewatering line 53 by means of a filter 54 inside the canister 51. A vacuum pump 55 and/or pressure source (e.g., air, nitrogen, or inert gas) assist the dewatering process with the removed water being returned through the dewatering line 53 to the cut zone enclosure 11 after passing through a polishing filter (typically 0.3 to 0.5 micron), thereby maintaining a closed-loop system. A hood 57 is placed over the disposal canister station 50 and has an outlet 58 in communication with a HEPA gas filtration system 59 for purging gas from an area above the disposal canister station 50 as may emanate during the changing of cannister (51).

Small size particles (typically less than 15 to 50 micron), which are not removed from the water as concentrate in the solid media filter module 30, are directed to a cartridge filter module 60. The cartridge filter module 60 includes a plurality of cartridge filters 61, 62 sized to handle the full flushing flow rate from the solid media filter module 30. The cartridge filters 61, 62 preferably include at least one coarse filter 61 and at least one fine filter 62 for removing particles in at least two stages based on a size of the particles. The water flow leaving the cartridge filter module 60 is redirected to the cut zone enclosure 11 to maintain a closed-loop system.

Although the cut zone enclosure 11 is used in the preferred embodiment, the filtration system 10 of the present invention can also be used in the manner described above to concentrate radioactive debris particulate in a general water pool area 12 without a cut zone enclosure.

The filtration system 10 according to the present invention includes several design features to facilitate operation and maintenance, and to reduce the radiation dose to personnel. For example, the equipment of the filtration system 10 is packaged in modules as described above to allow easy removal and replacement of each module or station separate from the other components of the filtration system. The equipment also includes remotely operable disconnects and isolation valves on each module and between major components within the modules to facilitate removal and replacement.

The materials of construction are stainless steel with surfaces being bright annealed, electropolished or mechanically polished to facilitate decontamination and reduction of dose to personnel during maintenance and/or disposal. All of the equipment is designed to minimize pockets and dead zones, which are often a source for buildup of contaminated particulate. All valves used in the filtration system 10 are smooth bore (i.e., ball valves) to further minimize a buildup of contaminated particulate. Where flexible hose is used (e.g., to place the various modules in fluid communication with each other), the inside diameter of the flexible hose is smooth bore. The pumps 21, 42 of the filtration system 10 are designed for long term handling of particles that may be abrasive.

Instrumentation including a flow meter 70 and pressure transducers 71 with remote indicators 72, 73 are included to monitor the performance of the filtration system 10. The system contains sufficient redundancy to eliminate or minimize the need to stop cutting operations for filtration system servicing, including the filling and handling of the waste canisters 23, 51. The system can be operated with a minimum of attendance, thereby reducing the radiation dose to operating personnel in the pool area 12. Flushing connections are included in the filtration system to purge out the radioactive particulate prior to removing a module or component from the pool, thereby minimizing the radiation dose to operating personnel.

The filtration system according to the present invention has the following advantages over systems that are commonly used during the segmentation of activated reactor vessel internals and components.

The filtration system 10 is a closed or nearly closed system, which prevents or minimizes contamination of the general pool area water 12. This system approach: reduces the dose to operating personnel by confining contamination; reduces cross contamination of other equipment; minimizes the post segmentation water processing complexity and expense since the volume of highly contaminated water is minimized and can be treated separately and in less time; and reduces the complexity and expense of decontamination of the general pool area walls and radiation dose to operating personnel once the water is drained.

The volume of secondary radioactive waste is minimized by separation of particle sizes. The large size particles, which are large enough to be disposed of directly with solid waste, are removed first by the separator 22. The solid media filters 31 remove additional medium size particles through concentrating and purging to a handling system 40, 50 that directly fills high integrity disposal canisters 51 that meet stabilization criteria. The low flow rate of the concentrated flow to the disposal canister station 50 allows using a minimum size dewatering filter 54 in the disposal canister 51. The cartridge filters 61, 62, which form the major part of secondary waste, are minimized since large size particles are removed by the flushing pump module 20 and medium size particles are removed by the solid media filter module 30, thereby leaving only a small mass of particles that the cartridge filter module 60 must remove.

The system is of a flexible design and can handle waste from mechanical processes (e.g., machining and waterjet) or thermal processes (e.g., plasma and MDM/EDM), which represent a wide range of particle sizes.

It will be appreciated that the present invention is not limited to the exact constructions that have been described above and illustrated in the accompanying drawings, and that various modifications and changes can be made without departing from the scope and spirit of the invention. It is intended that the scope of the invention only be limited by the appended claims.

What is claimed is:

1. A filtration system for concentrating radioactive debris particulate, comprising:

a flushing pump module that draws contaminated water from a water volume, said flushing pump module having a separator that removes particulate greater than a first predetermined size from the contaminated water;

a solid media filter module in fluid communication with said flushing pump module, said solid media filter module having at least one solid media filter for removing particulate greater than a second predetermined size from the contaminated water, and a structure for ejecting the particulate greater than the second predetermined size from the solid media filter;

a concentrate handling module in fluid communication with said solid media filter module to receive particulate greater than the second predetermined size ejected from said solid media filter, said concentrate handling module comprising a tank and a transfer pump; and a disposal canister station in fluid communication with said transfer pump of said concentrate handling module, said disposal canister station having a structure that fills disposal canisters with said particulate greater than the second predetermined size for disposal, wherein the first predetermined size is larger than the second predetermined size.

2. The filtration system according to claim 1, further comprising a cartridge filter module in fluid communication with said so lid media filter module to receive a flushing flow of water from said solid media filter module, said cartridge filter module comprising at least one cartridge filter for removing particulate greater than a third predetermined size from the flushing flow of water passing from said solid media filter module, wherein the second predetermined size is larger than the third predetermined size.

3. The filtration system according to claim 2, wherein said at least one cartridge filter comprises a coarse cartridge filter and a fine cartridge filter, whereby said particulate greater than the third predetermined size is removed in two stages.

4. The filtration system according to claim 2, wherein said flushing pump module, said solid media filter module, said concentrate handling module, said cartridge filter module, and said disposal canister station are each provided with remotely operable disconnects and isolation valves that allow separate removal and replacement thereof.

5. The filtration system according to claim 1, wherein said separating means of said flushing pump module comprises at least one of a settling tank, a cyclone, and a screen for separating particulate greater than the first predetermined size from the contaminated water and passing said particulate greater than the first predetermined size into a transfer container.

6. The filtration system according to claim 1, further comprising a cut zone enclosure submerged in the water volume for separating and containing a portion of the water volume from a remainder of the water volume, said cut zone enclosure having a suction inlet in fluid communication with said flushing pump module, wherein said flushing pump module draws contaminated water from said suction inlet in said cut zone enclosure.

7. The filtration system according to claim 6, further comprising a floating hood placed over said cut zone enclosure, said floating hood having an outlet in fluid communication with a gas filtration system for purging gas from an area above said cut zone enclosure.

8. The filtration system according to claim 6, further comprising a cartridge filter module in fluid communication with said solid media filter module to receive a flushing flow of water from said solid media filter module, said cartridge filter module comprising at least one cartridge filter for removing particulate greater than a third predetermined size from the flushing flow of water passing from said solid media filter module,
wherein the second predetermined size is larger than the third predetermined size.

9. The filtration system according to claim 8, wherein said cartridge filter module is in fluid communication with said cut zone enclosure to return a filtered water flow into said cut zone enclosure.

10. The filtration system according to claim 6, wherein said disposal canister station further comprises means for removing water from said canisters, and an outlet of said disposal canister station is in fluid communication with said cut zone enclosure to return the water removed from said canisters into said cut zone enclosure.

11. The filtration system according to claim 1, wherein said disposal canister station further comprises means for removing water from said canisters and returning the removed water to said water volume.

12. The filtration system according to claim 1, further comprising a control and timer means for causing the particles greater than the second predetermined size to be ejected periodically from said solid media filter into said concentrate handling module.

13. The filtration system according to claim 1, further comprising a polishing filter in fluid communication with an outlet of said disposal canister station for filtering water being passed from said disposal canister station back into said water volume.

14. The filtration system according to claim 1, wherein said disposal canister station is located beneath an upper surface of said water volume.

15. A closed-loop filtration system for removing radioactive particulate from a volume of fluid, comprising:
an enclosure submerged in a fluid volume for isolating a portion of the fluid volume from a remainder of the fluid volume;
a filtering arrangement having an inlet that receives contaminated fluid from said enclosure, a structure that removes radioactive particulate from the contaminated fluid in multiple stages according to a size of the particulate, and an outlet that returns the fluid back into said enclosure; and
a floating hood positioned over said enclosure, said floating hood having an outlet in fluid communication with a gas filtration system for purging gas from an area above said enclosure.

16. The closed-loop filtration system according to claim 15, wherein said filtering arrangement comprises a first means for removing particulate greater than a first predetermined size from said contaminated fluid, a second means for removing particulate greater than a second predetermined size from said contaminated fluid, and a third means for removing particulate greater than a third predetermined size from said contaminated fluid,
wherein the first predetermined size is larger than the second predetermined size, and the second predetermined size is larger than the third predetermined size.

17. The closed-loop filtration system according to claim 15, wherein said filtering arrangement comprises a plurality of solid media filters that remove and concentrate particulate from the contaminated fluid, and a means for transferring the concentrated particulate into a disposal canister.

18. The closed-loop filtration system according to claim 17, wherein said filtering arrangement further comprises a plurality of cartridge filters that receive a fluid flow from said solid media filters and remove additional particulate from said fluid flow.

\* \* \* \* \*

UNITED STATES PATENT AND TRADEMARK OFFICE
CERTIFICATE OF CORRECTION

PATENT NO.   : 6,197,188 B1
DATED        : March 6, 2001
INVENTOR(S)  : Edward F. Lamoureux Page 1 of 1

It is certified that error appears in the above-identified patent and that said Letters Patent is hereby corrected as shown below:

<u>Title page,</u>
Item [73], assignee information, should read -- [73] CE Nuclear Power LLC, Windsor, CT (US) --

<u>Column 6, claim 2,</u>
Line 48, "so lid" should be -- solid --.

Signed and Sealed this

Fifteenth Day of January, 2002

Attest:

JAMES E. ROGAN
*Director of the United States Patent and Trademark Office*

*Attesting Officer*